United States Patent
Miyamoto et al.

(10) Patent No.: US 8,316,591 B2
(45) Date of Patent: Nov. 27, 2012

(54) SOLAR CELL MODULE DEVICE

(75) Inventors: Shinsuke Miyamoto, Chiyoda-ku (JP); Yoshiyuki Suganuma, Chiyoda-ku (JP); Naoki Ito, Chiyoda-ku (JP); Hiroyoshi Takikawa, Chiyoda-ku (JP); Issei Suzuki, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 193 days.

(21) Appl. No.: 12/597,258

(22) PCT Filed: May 14, 2007

(86) PCT No.: PCT/JP2007/059885
§ 371 (c)(1),
(2), (4) Date: Oct. 23, 2009

(87) PCT Pub. No.: WO2008/139609
PCT Pub. Date: Nov. 20, 2008

(65) Prior Publication Data
US 2010/0132767 A1    Jun. 3, 2010

(51) Int. Cl.
*E04D 13/18*    (2006.01)
*E04H 14/00*    (2006.01)
(52) U.S. Cl. ..................................... 52/173.3
(58) Field of Classification Search .............. 52/173.3, 52/173.1, 1, 518, 554, 105, 403.1, 775, 783.1, 52/506.06
See application file for complete search history.

(56) References Cited

U.S. PATENT DOCUMENTS

| | | | | |
|---|---|---|---|---|
| 5,287,670 A | * | 2/1994 | Funaki | 52/544 |
| 6,245,987 B1 | * | 6/2001 | Shiomi et al. | 136/244 |
| 6,506,970 B2 | * | 1/2003 | Yamawaki | 136/251 |
| RE38,988 E | * | 2/2006 | Dinwoodie | 136/251 |
| 7,012,188 B2 | * | 3/2006 | Erling | 136/251 |
| 7,237,360 B2 | * | 7/2007 | Moncho et al. | 52/28 |
| 2003/0150444 A1 | * | 8/2003 | Cedenblad | 126/709 |
| 2003/0201009 A1 | * | 10/2003 | Nakajima et al. | 136/251 |

(Continued)

FOREIGN PATENT DOCUMENTS

GB    2340993 B    10/2003

(Continued)

OTHER PUBLICATIONS

International Search Report for PCT/JP2007/059885 completed Aug. 6, 2007.

(Continued)

*Primary Examiner* — Mark Wendell
*Assistant Examiner* — Keith Minter
(74) *Attorney, Agent, or Firm* — Buchanan Ingersoll & Rooney PC (57) ABSTRACT

A solar cell module device includes a solar cell module formed by arranging plural solar battery cells; a reinforcing frame arranged on a back surface of the solar cell module; and a buffer material made of a rigid material and arranged between the solar cell module and the reinforcing frame. The buffer material has a size not causing the back surface of the solar cell module to come in contact with the reinforcing frame when the solar cell module is bent relative to a length of the reinforcing frame in a longitudinal direction. Therefore, the reinforcing frame does not bury into the buffer material, moreover, the buffer material does not abrade by coming in contact with the reinforcing frame.

14 Claims, 10 Drawing Sheets

U.S. PATENT DOCUMENTS

2005/0126622 A1* 6/2005 Mukai et al. .................. 136/251

FOREIGN PATENT DOCUMENTS

| JP | 07-007170 A | 1/1995 |
| JP | 9-148612 A | 6/1997 |
| JP | 10-294485 A | 11/1998 |
| JP | 2000-31517 A | 1/2000 |
| JP | 2003-31833 | 1/2003 |
| JP | 2004-6625 A | 1/2004 |
| JP | 2004-87884 | 3/2004 |

OTHER PUBLICATIONS

Written Opinion for PCT/JP2007/059885 completed Aug. 6, 2007.
Extended European Search Report dated Feb. 3, 2012 issued by the European Patent Office in corresponding European Application No. 07743320.9 (7 pages).
Notice of Rejection dated Jan. 10, 2012 issued by the Japanese Patent Office in corresponding Japanese Application No. 2009-513942 and partial English-language translation (15 pages).

* cited by examiner

SOLAR CELL MODULE DEVICE

TECHNICAL FIELD

The present invention relates to a solar cell module device installed on a construction such as a house and a building.

BACKGROUND ART

Conventionally, solar cell module devices with the following configuration are used at various places and for various purposes. A transparent substrate (glass) is arranged at a light-receiving side, plural solar battery cells connected in series, or in parallel, are arranged on the back side of the transparent substrate, and the solar battery cells are then sealed with a sealing resin to constitute a solar cell module. A frame is fitted to an outer-edge portion of the solar cell module, thereby providing a solar cell module device. Bigger and bigger solar cell module devices are being manufactured in recent years with the aim to lower cost per unit output and to shorten the time required for production and line connection work. However, with an increase in the size, the load resistance performance of the surface of the transparent substrate degrades.

Solar cell module devices are generally installed on a construction, such as a house and a building, where they are exposed to the weather. When, for example, snow accumulates on the top surface the solar cell module device, a positive pressure that is operative to vertically press down the solar cell module device acts on the solar cell module device. On the other hand, a negative pressure that is operative to push the solar cell module device acts on the solar cell module device due to wind and the like. Because the top surface of the solar cell module, which functions as a light-receiving surface, has a wide planer structure with a large area, the module is vertically bent in a curve when receiving the positive pressure and the negative pressure.

Various techniques have been conventionally employed to avoid breakage of the module due to downward bending thereof by the positive pressure that is operative to vertically press down the module. One such conventional technique employs a configuration having a reinforcing frame arranged at the back surface of the module and having a buffer material fixed to the back surface to have the material positioned between the module and the reinforcing frame. In this configuration, the back surface of the module is not in direct contact with the reinforcing frame, and therefore breakage and abrasion of the back surface can be prevented (see, for example, Patent Document 1).

Patent Document 1: Japanese Patent Application Laid-open No. 2004-6625

DISCLOSURE OF INVENTION

Problems to be Solved by the Invention

However, according to the solar cell module device having the configuration as proposed in Patent Document 1 mentioned above, the buffer material is an elastic body. Therefore, when the load acting on the module increases, the reinforcing frame is buried into the buffer material, and the module may directly come in contact with the reinforcing frame at a portion where the buffer material is not arranged. Consequently, there is a need for improvement that can solve this problem. Furthermore, friction is frequently produced between the buffer material, which is an elastic body, and the reinforcing frame because of vibrations due to wind and the like. Consequently, there is a need for improvement that can solve this problem.

Moreover, in the conventional solar cell module device, because the buffer material is not fixed to the reinforcing frame, when the negative pressure acts on the module, it is pulled upward and is bent, resulting in breakage and occurrence of percussive noises.

The present invention has been achieved to solve the above problems, and an object of the invention is to provide a solar cell module device in which the reinforcing frame does not bury into the buffer material, and in which the buffer material is not abraded by coming in contact with the reinforcing frame. Another object of the present invention is to provide a solar cell module device capable of suppressing upward bending of a solar cell module even when a negative pressure acts on it.

Means for Solving Problem

To solve the above problems and to achieve the above objects, according to an aspect of the present invention, there is provided a solar cell module device including a solar cell module formed by arranging a plurality of solar battery cells; a reinforcing frame arranged on a back surface of the solar cell module; and a buffer material made of a rigid material and arranged between the solar cell module and the reinforcing frame. The buffer material has a size not causing the back surface of the solar cell module to come in contact with the reinforcing frame when the solar cell module is bent relative to a length of the reinforcing frame in a longitudinal direction.

EFFECT OF THE INVENTION

According to the present invention, a reinforcing frame is not bury into a buffer material, and the buffer material is not abraded by coming in contact with the reinforcing frame.

EXPLANATIONS OF LETTERS OR NUMERALS 1 long-side frame
2 short-side frame
3 reinforcing frame
10 rack-shaped frame
15 solar battery cell
20 solar cell module
20a terminal box
20b cable
31 to 37 buffer material
34a positioning projection
35a slit
37a holding unit
H gap

BEST MODE(S) FOR CARRYING OUT THE INVENTION

Exemplary embodiments of a solar cell module device according to the present invention will be explained below in detail with reference to the accompanying drawings. The present invention is not limited to the embodiments.

First Embodiment

Figure 1:
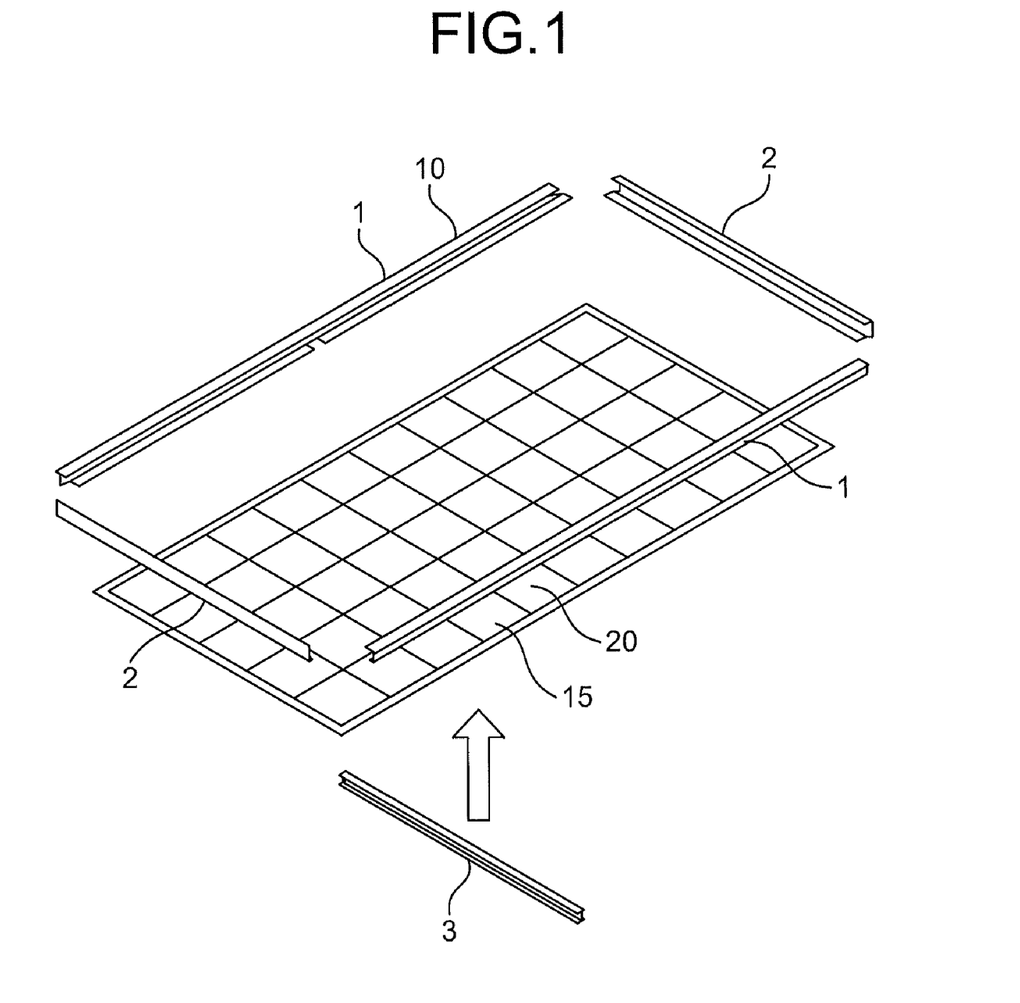
FIG. 1 is a perspective view of a state in an initial step in an assembly process of a solar cell module device according to a first embodiment of the present invention.
Figure 2:
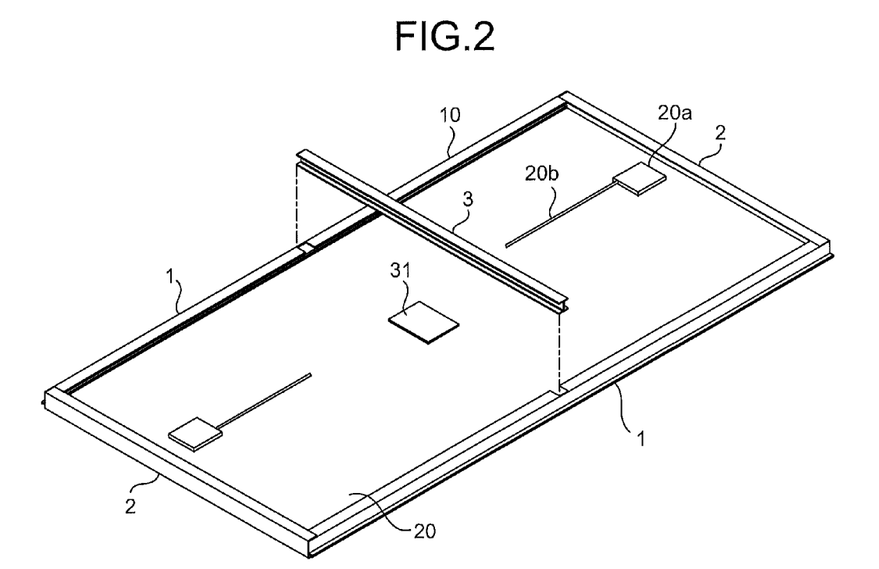
FIG. 2 is a perspective view of a state that a reinforcing frame is fitted from a back side to an intermediate assembly, the intermediate assembly being an article obtained by fixing a rack-shaped frame to an outer-edge portion of a solar cell module.
Figure 3:
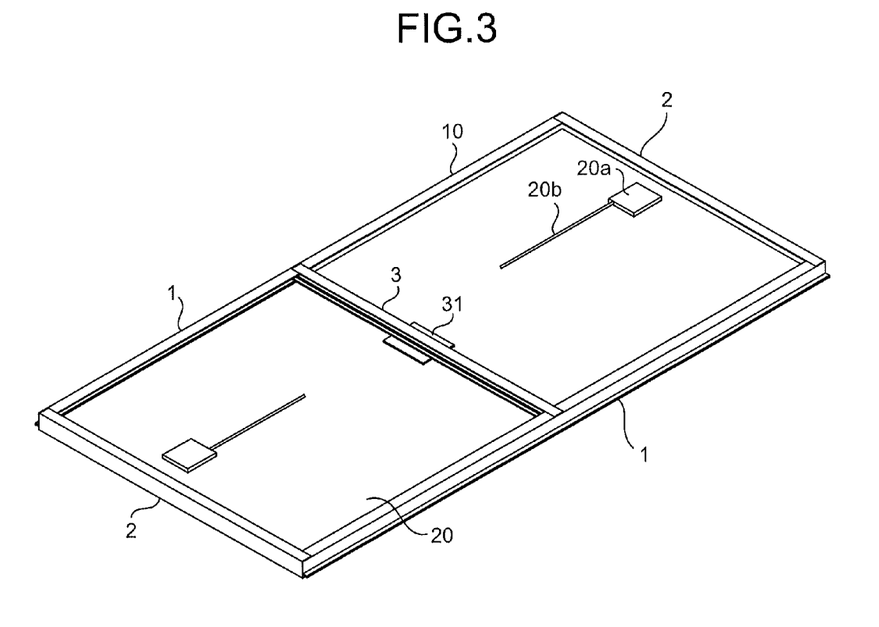
FIG. 3 is a perspective view of a state that fitting of the reinforcing frame to the intermediate assembly is completed.
Figure 4:
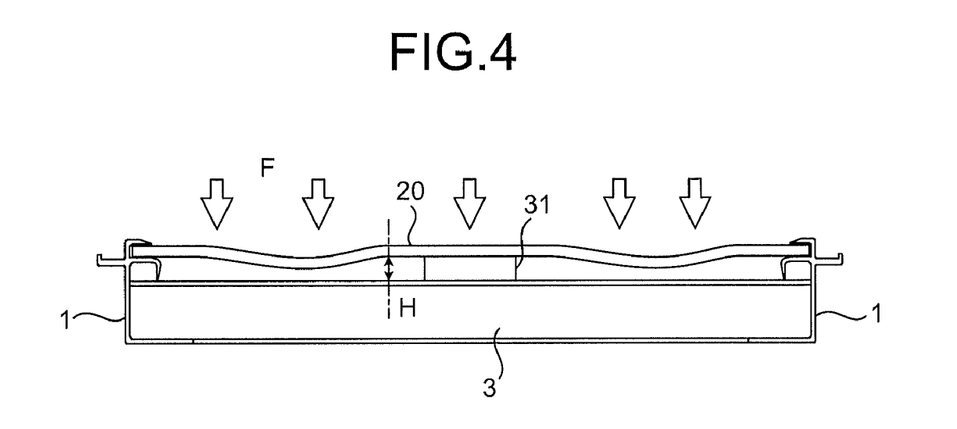
FIG. 4 is a cross-sectional view of a state that the solar cell module is not in contact with the reinforcing frame even when the solar cell module is bent when a positive pressure acts.
Figure 5:
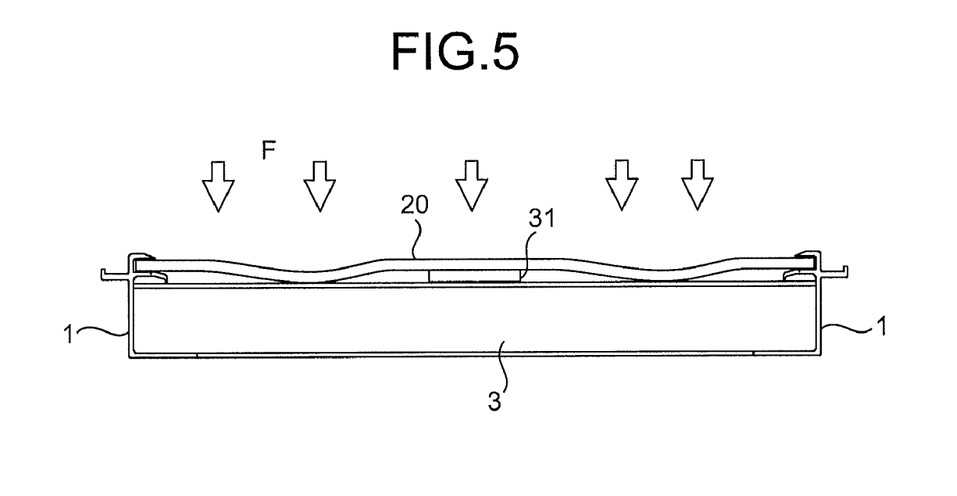
FIG. 5 is for the purpose of comparison with FIG. 4, and is a cross-sectional view of a state that the solar cell module is in contact with the reinforcing frame when the height of a buffer material is small.

FIG. 1 is a perspective view of a state in an initial step in an assembly process of a solar cell module device according to a first embodiment of the present invention. FIG. 2 is a perspective view of a state that a reinforcing frame is fitted from a back side to an intermediate assembly, the intermediate assembly being an article obtained by fixing a rack-shaped frame to an outer-edge portion of a solar cell module. FIG. 3 is a perspective view of a state that fitting of the reinforcing frame to the intermediate assembly is completed. FIG. 4 is a cross-sectional view of a state that the solar cell module is not in contact with the reinforcing frame even when the solar cell module is bent when a positive pressure acts. FIG. 5 is for the purpose of comparison with FIG. 4, and is a cross-sectional view of a state that the solar cell module is in contact with the reinforcing frame when the height of a buffer material is small. FIG. 1 depicts a state that the solar cell module is viewed from a front side thereof. On the other hand, FIGS. 2 and 3 depict a state that the solar cell module is viewed from a back side thereof.

The solar cell module device includes a solar cell module 20 of a substantially rectangular plane shape. Furthermore, a buffer material 31 is fixed to a back surface of the solar cell module 20, a rack-shaped frame 10 of a rectangular rack shape is provided surrounding the whole periphery of an outer-edge portion of the solar cell module 20, and a reinforcing frame 3 is fitted to the rack-shaped frame 10. The buffer material 31 is sandwiched between the solar cell module 20 and the reinforcing frame 3.

As shown in FIG. 1, the solar cell module 20 has a substantially rectangular plane shape and includes a plurality of solar battery cells 15 that are arranged in a two-dimensional matrix. The rack-shaped frame 10 is configured by a pair of opposite long-side frames 1, 1, and a pair of short-side frames 2, 2 coupled between both ends of the long-side frames 1, 1. The pair of long-side frames 1, 1 and the pair of short-side frames 2, 2 are coupled to each other to form the rack-shaped frame 10 of a rectangular rack shape.

As shown in FIG. 2, the buffer material 31 is made of a rigid material, such as aluminum or a rigid resin, and has a substantially flat shape and it is fixed to the back surface of the solar cell module 20. Notches are provided at substantially center portions of the back surfaces of the long-side frames 1, 1 and the reinforcing frame 3 is inserted those notches. Both ends of the reinforcing frame 3 are inserted in these notches from the back surface side of the solar cell module 20, and are fitted to the long-side frames 1, 1. Terminal boxes 20a and cables 20b, which extend from the terminal boxes 20a, are also provided on the back surface of the solar cell module 20.

As shown in FIG. 3, the reinforcing frame 3 is fitted to the rack-shaped frame 10 by being bridged over to the opposite long-side frames 1, 1 of the rack-shaped frame 10. The reinforcing frame 3 is fitted at such a position that the buffer material 31 is sandwiched between the reinforcing frame 3 and the solar cell module 20.

As shown in FIG. 4, the buffer material 31 has a predetermined height, and a predetermined gap H is formed between the solar cell module 20 and the reinforcing frame 3. Because of this configuration, even when the solar cell module 20 is bent when a positive pressure working as shown by arrows F in FIG. 4 acts on it, the back surface of the solar cell module 20 does not come in contact with the reinforcing frame 3. However, as shown in FIG. 5, if the height of the buffer material 31 is small, the solar cell module 20 can come in contact with the reinforcing frame 3. Furthermore, when the buffer material 31 is not made of a rigid material, unlike the buffer material according to the present embodiment, and also when the buffer material 31 is made of an elastic material like in the conventional technique, the height of the buffer material 31 may be reduced by being pressed by the solar cell module 20, and the solar cell module 20 may come in contact with the reinforcing frame 3 in a similar manner.

In the present embodiment, because the buffer material 31 is made of a rigid material, the height of the buffer material is not reduced even when the buffer material 31 is pressed by the solar cell module 20. Whether the solar cell module 20 could come in contact with the reinforcing frame 3 can be determined based on the rigidity of the solar cell module 20, the length of the reinforcing frame 3 in a longitudinal direction, and the height of the buffer material 31. The height of the buffer material 31 is chosen such that the back surface of the solar cell module 20 does not come in contact with the reinforcing frame 3 even when the solar cell module 20 is bent.

As explained above, in the solar cell module device of the present embodiment, the reinforcing frame 3 does not bury into the buffer material 31 because the buffer material 31 is made of a rigid material. The height of the buffer material 31 is such that the back surface of the solar cell module 20 does not come in contact with the reinforcing frame 3 when the solar cell module is bent relative to a length of the reinforcing frame 3 in a longitudinal direction. Therefore, the buffer material 31 is not abraded by coming in contact with the reinforcing frame 3. When the buffer material 31 has an appropriate height, it is not necessary to provide the buffer material 31 over the whole length of the reinforcing frame 3. Consequently, the buffer material 31 can be short relative to the reinforcing frame 3, and use of materials can be reduced and cost reduction can be made.

Second Embodiment

Figure 6:
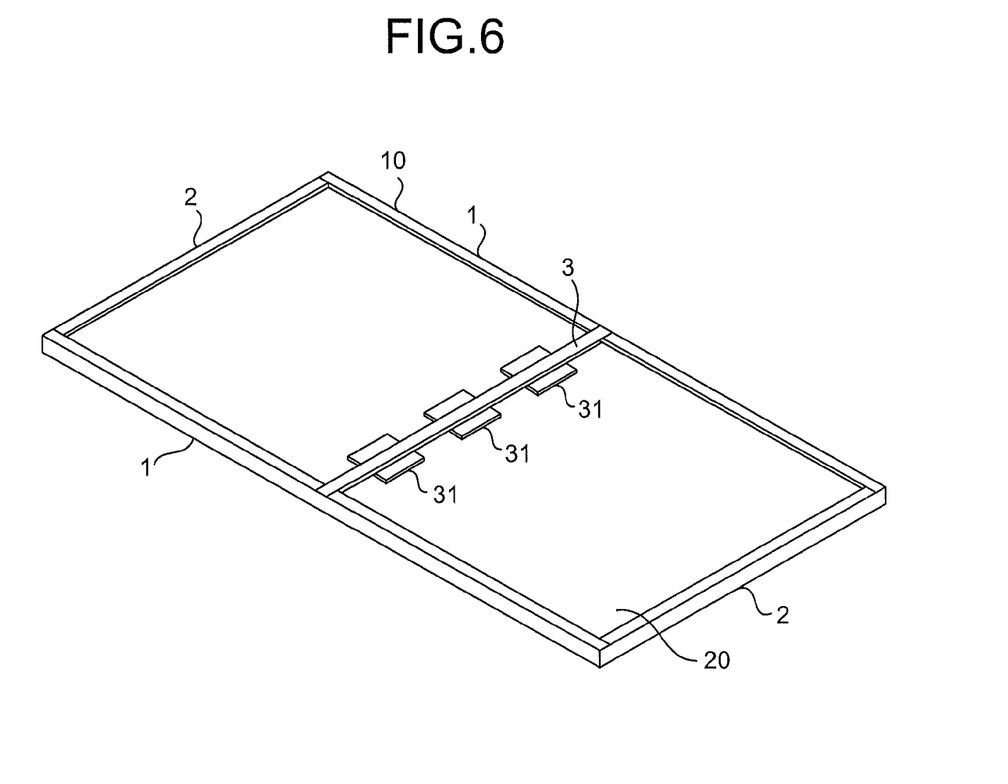
FIG. 6 is a perspective view of a state that a solar cell module device according to a second embodiment of the present invention is viewed from the back side thereof.

FIG. 6 is a perspective view of a state that a solar cell module device according to a second embodiment of the present invention is viewed from the back side thereof. In the present embodiment, two or more buffer materials 31 are arranged in a length direction of the reinforcing frame 3.

In the solar cell module device of the present embodiment, whether the solar cell module 20, when a predetermined positive pressure acts on it, could come in contact with the reinforcing frame 3 can be determined by the rigidity of the solar cell module 20, the length of portions where the buffer materials 31 are not provided out of the total length of the reinforcing frame 3 in a longitudinal direction, and the height of the buffer materials 31. In the present embodiment, the buffer materials 31 are arranged in the length direction of the reinforcing frame 3. By reducing the length of portions where the buffer materials 31 are not provided, contact of the back surface of the solar cell module 20 to the reinforcing frame 3 is suppressed.

That is, while contact of the solar cell module 20 to the reinforcing frame 3 is suppressed by using the buffer material 31 of a predetermined height in the first embodiment, contact of the solar cell module 20 to the reinforcing frame 3 is suppressed by setting a length of the buffer materials 31 in a longitudinal direction of the reinforcing frame 3 to a predetermined length in the present embodiment.

In the present embodiment, while the buffer materials 31 are arranged by providing a space at a predetermined interval in the length direction of the reinforcing frame 3, the buffer materials can be also provided over the whole length of the reinforcing frame 3. That is, one or more buffer materials having the same total length as that of the reinforcing frame 3 can be provided between the solar cell module 20 and the reinforcing frame 3. With this configuration, contact of the solar cell module 20 to the reinforcing frame 3 can be prevented irrespectively of the height of the buffer materials.

Third Embodiment

Figure 7:
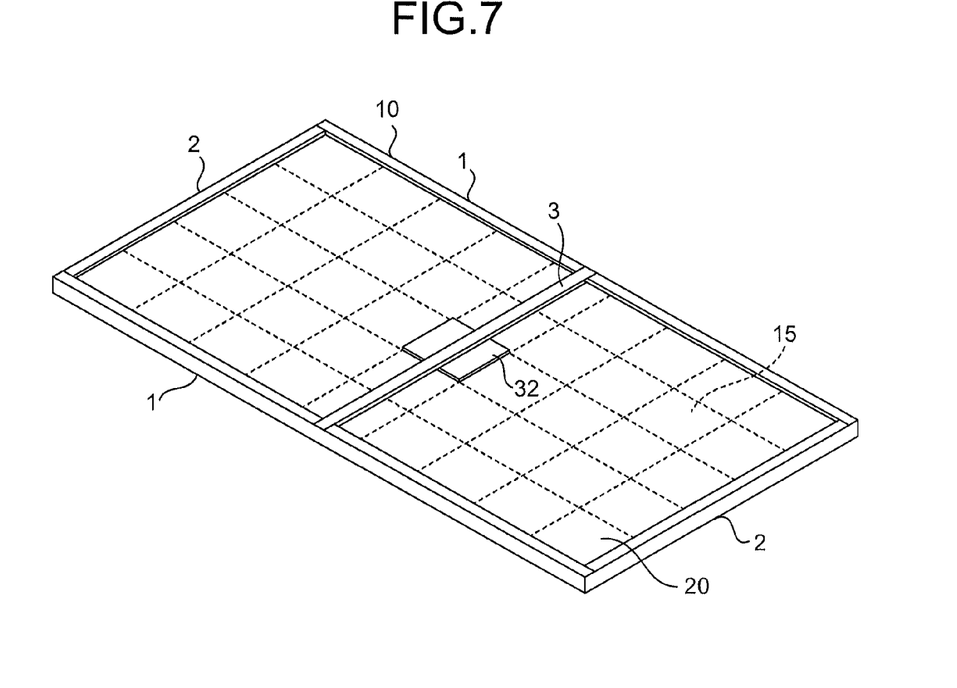
FIG. 7 is a perspective view of a state that a solar cell module device according to a third embodiment of the present invention is viewed from the back side thereof.

FIG. 7 is a perspective view of a state that a solar cell module device according to a third embodiment of the present invention is viewed from the back side thereof. A buffer material 32 according to the present embodiment has the same external-outline shape as that of the solar battery cell 15. The buffer material 32 is fixed to the solar cell module 20 by matching four sides with an outline of the solar battery cell 15 transparently visible on the back surface of the solar cell module 20.

As explained in the first embodiment, the buffer material is fixed to the back surface of the solar cell module 20 before the reinforcing frame 3 is inserted in the notches provided in the long-side frames 1, 1. However, conventionally, it was difficult to fix the buffer material to an appropriate position of the reinforcing frame 3.

In the solar cell module of the present embodiment, the buffer material 32 has the same shape as that of the solar battery cell 15. The buffer material 32 is fixed to be superimposed with one solar battery cell 15 based on a mark of an outline of the solar battery cell 15 transparently visible on the back surface of the solar cell module 20. Therefore, the buffer material 32 can be easily fixed to an appropriate position of the reinforcing frame 3, and the solar battery cell 15 can be protected.

Fourth Embodiment

Figure 8:
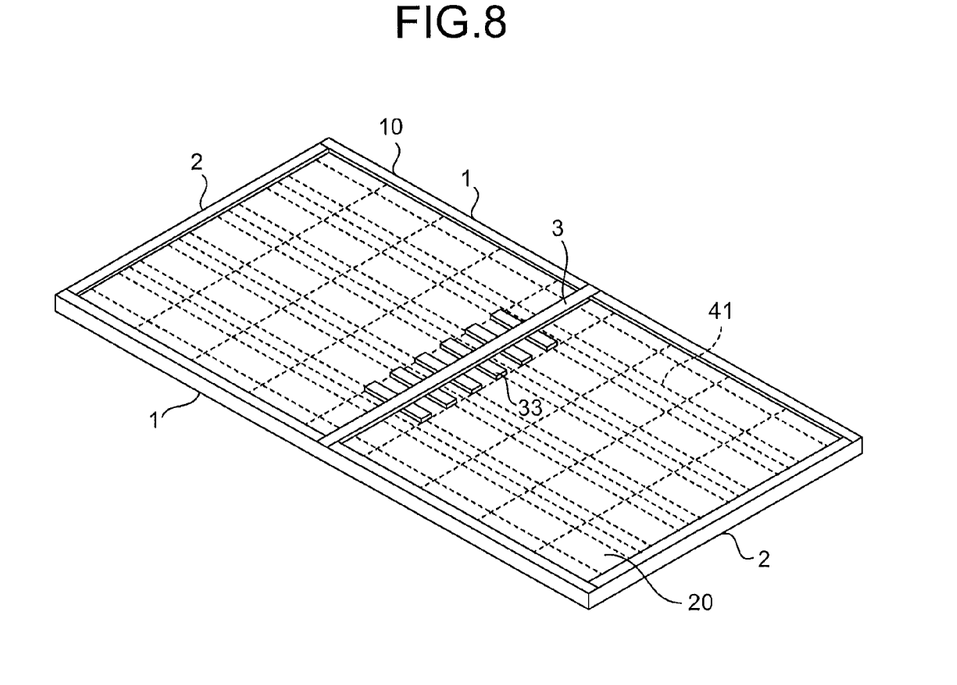
FIG. 8 is a perspective view of a state that a solar cell module device according to a fourth embodiment of the present invention is viewed from a back side thereof.

FIG. 8 is a perspective view of a state that a solar cell module device according to a fourth embodiment of the present invention is viewed from a back side thereof. A buffer material 33 according to the present embodiment has a slender shape in an external outline corresponding to lines 41 on which electrodes of solar battery cells are arranged. The buffer material 33 is fixed to the back surface of the solar cell module 20 by matching a side surface with the lines 41 of the electrode transparently visible on the back surface of the solar cell module 20. Therefore, the buffer material 33 can be easily fixed to an appropriate position of the reinforcing frame 3, and the electrodes of the solar battery cells can be protected.

Fifth Embodiment

Figure 9:
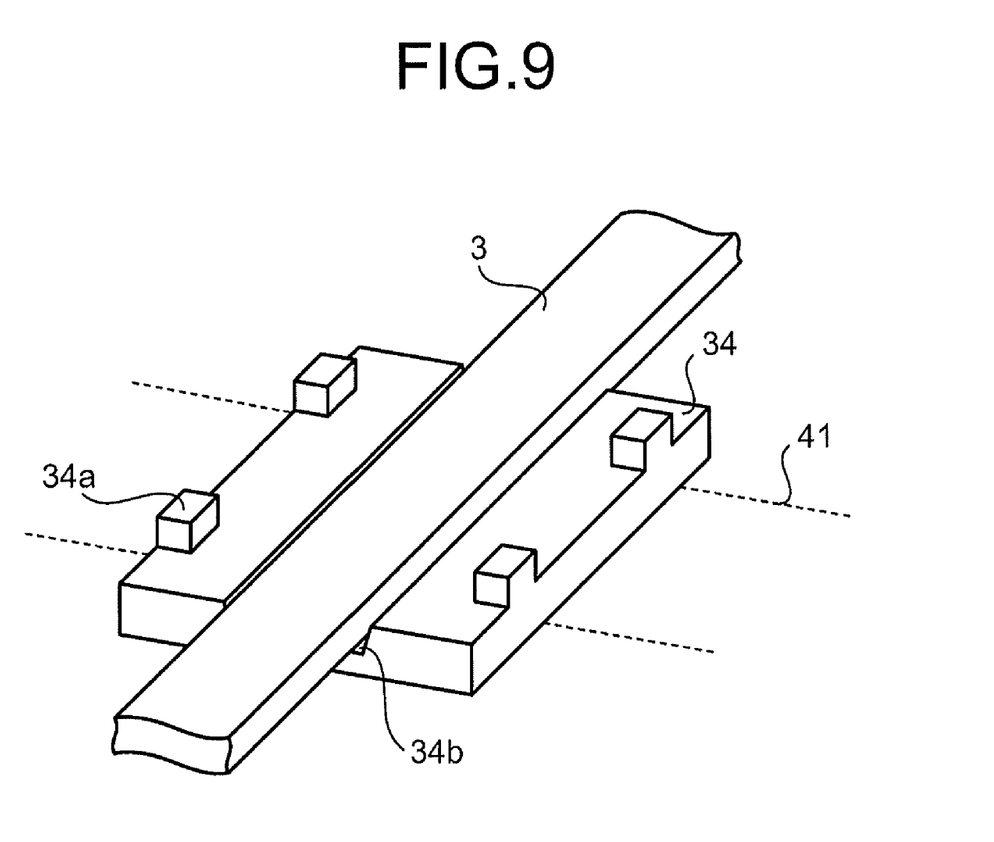
FIG. 9 is an enlarged perspective view of a vicinity of a buffer material of a solar cell module device according to a fifth embodiment of the present invention.

FIG. 9 is an enlarged perspective view of a vicinity of a buffer material of a solar cell module device according to a fifth embodiment of the present invention. A buffer material 34 according to the present embodiment is provided with positioning projections 34a used as marks at positions corresponding to the lines 41 on which electrodes of solar battery cells are arranged. The buffer material 34 is fixed to the back surface of the solar cell module 20 by matching the positioning projections 34a with the lines 41 of the electrodes transparently visible on the back surface of the solar cell module 20. Therefore, the buffer material 34 can be easily fixed to an appropriate position of the reinforcing frame 3. While positioning marks are provided using projections in the buffer material 34 according to the present embodiment, positioning marks can be also provided using recesses or coloring.

Sixth Embodiment

Figure 10:
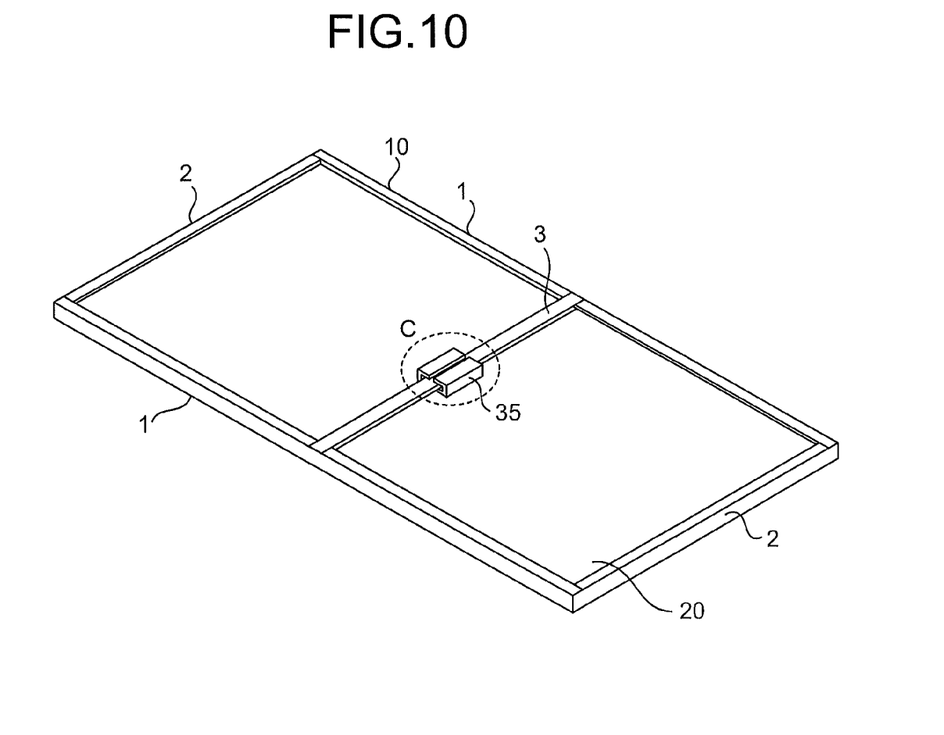
FIG. 10 is a perspective view of a state that a solar cell module device according to a sixth embodiment of the present invention is viewed from the back side thereof.
Figure 11:
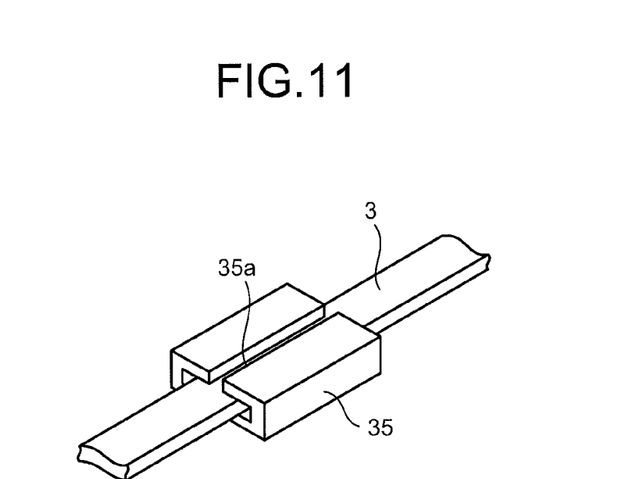
FIG. 11 is an enlarged perspective view of a vicinity C of a buffer material shown in FIG. 10.

FIG. 10 is a perspective view of a state that a solar cell module device according to a sixth embodiment of the present invention is viewed from the back side thereof. FIG. 11 is an enlarged perspective view of a vicinity C of a buffer material shown in FIG. 10. A buffer material 35 according to the present embodiment has a cylindrical shape with a substantially rectangular cross section. Moreover, the buffer material 35 is provided with a slit 35a that divides the buffer material 35 in a direction orthogonal to the reinforcing frame 3 on the back surface. The slit 35a has such a width that allows the reinforcing frame 3 to pass through the slit by changing a direction of the reinforcing frame 3. The buffer material 35 is arranged by having its surface at side of the solar cell module 20 fixed to the solar cell module 20, and having the reinforcing frame 3 pierced through the inside. The buffer material 35 is fitted to the reinforcing frame 3 movably in a longitudinal direction of the reinforcing frame 3. That is, the buffer material 35 is engaged with the reinforcing frame 3 to suppress a movement of the buffer material 35 to a direction of the solar cell module 20.

In the solar cell module device of the present embodiment, the butter material 35 fixed to the solar cell module 20 is engaged with the reinforcing frame 3 to suppress a movement of the buffer material 35 to a direction of the solar cell module 20. Therefore, even when a negative pressure acts on the solar cell module 20, bending of the solar cell module 20 in a direction convex to a front surface of the solar cell module 20 can be suppressed. Because the slit 35a is provided on the back surface of the buffer material 35, the reinforcing frame 3 can be easily fitted later.

Seventh Embodiment

Figure 12:
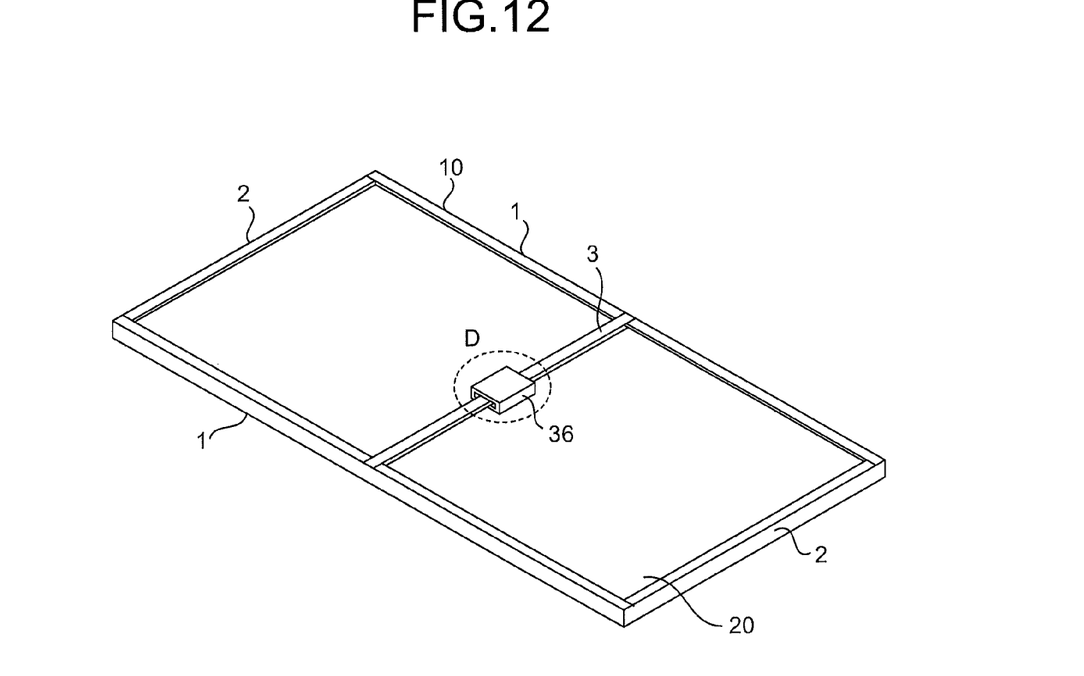
FIG. 12 is a perspective view of a state that a solar cell module device according to a seventh embodiment of the present invention is viewed from the back side thereof.

FIG. 12 is a perspective view of a state that a solar cell module device according to a seventh embodiment of the present invention is viewed from the back side thereof. FIG.

Figure 13:
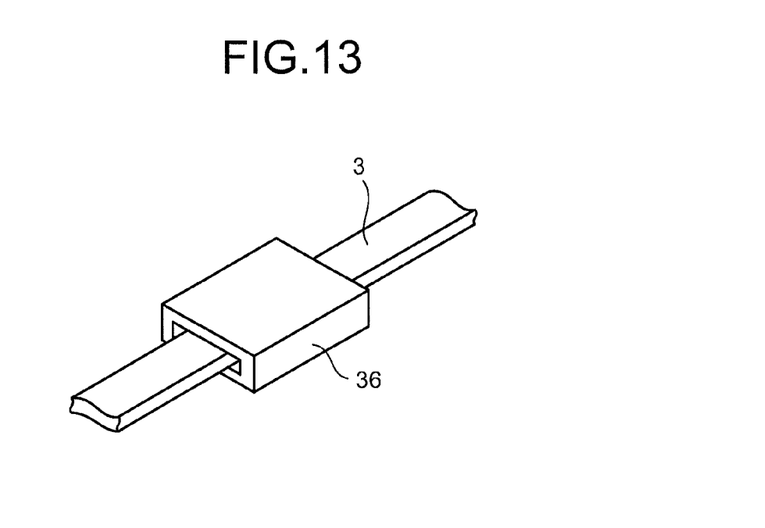
FIG. 13 is an enlarged perspective view of a vicinity D of a buffer material shown in FIG. 12.

13 is an enlarged perspective view of a vicinity D of a buffer material shown in FIG. 12. A buffer material 36 according to the present embodiment has a cylindrical shape with a substantially rectangular cross section. The buffer material 36 is arranged by having its surface at a side of the solar cell module 20 fixed to the solar cell module 20, and having the reinforcing frame 3 pierced through the inside. The buffer material 36 is fitted to the reinforcing frame 3 movably in a longitudinal direction of the reinforcing frame 3. That is, the buffer material 36 is engaged with the reinforcing frame 3 to suppress a movement of the buffer material 36 to a direction of the solar cell module 20. Also in the solar cell module device of the present embodiment, the butter material 36 fixed to the solar cell module 20 is engaged with the reinforcing frame 3 to suppress a movement of the buffer material 36 to a direction of the solar cell module 20. Therefore, even when a negative pressure acts on the solar cell module 20, bending of the solar cell module 20 in a direction convex to a front surface of the solar cell module 20 can be suppressed.

Eighth Embodiment

Figure 14:
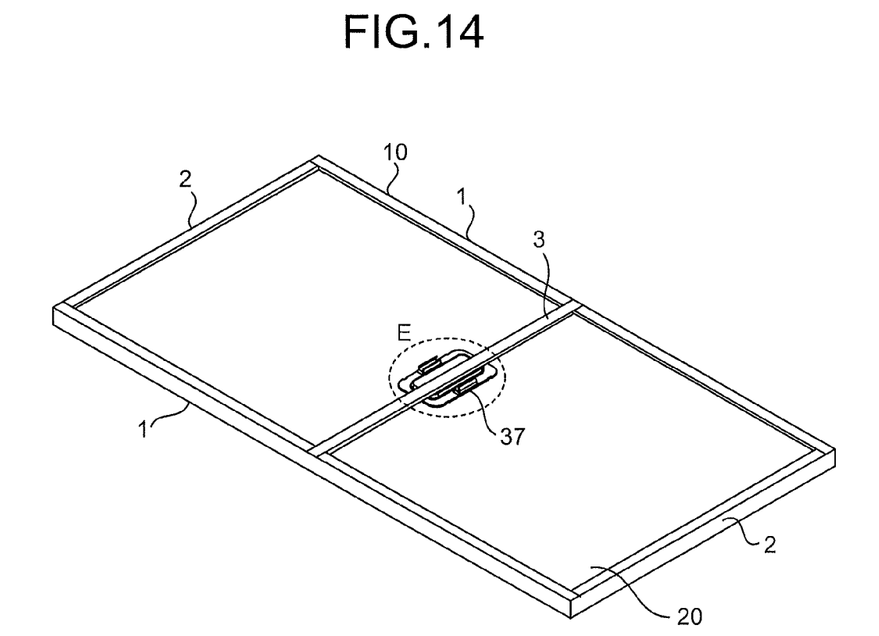
FIG. 14 is a perspective view of a state that a solar cell module device according to an eighth embodiment of the present invention is viewed from the back side thereof.
Figure 15:
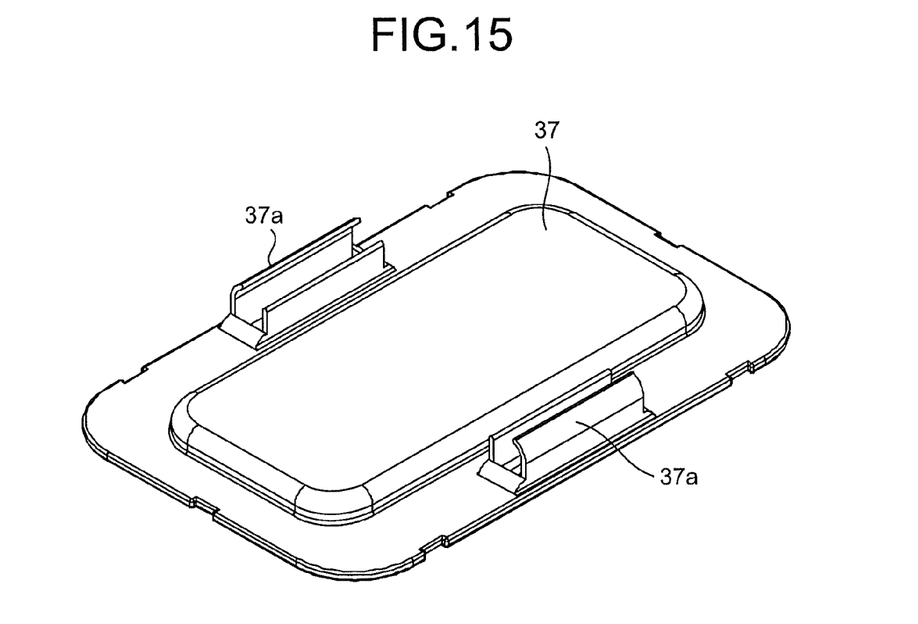
FIG. 15 is an enlarged perspective view of a vicinity E of a buffer material shown in FIG. 14.
Figure 16:
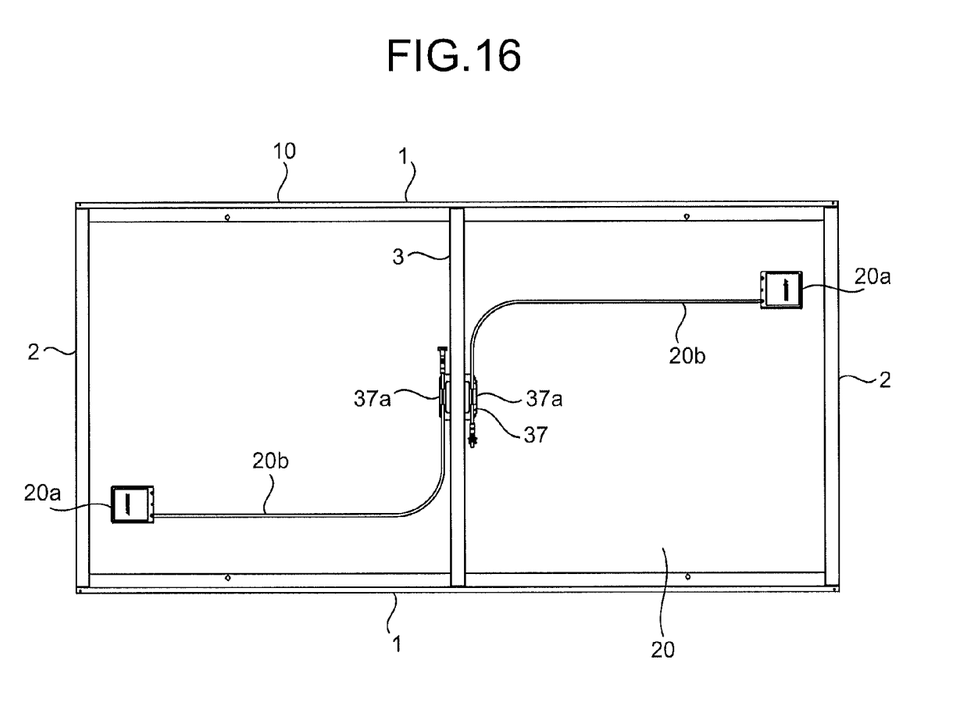
FIG. 16 depicts a state that a buffer material holds a cable extended on a back surface of the solar cell module as viewed from the back side thereof.

FIG. 14 is a perspective view of a state that a solar cell module device according to an eighth embodiment of the present invention is viewed from the back side thereof. FIG. 15 is an enlarged perspective view of a vicinity E of a buffer material shown in FIG. 14. A buffer material 37 according to the present embodiment is made of a rigid material such as a rigid resin. At both ends of long sides of the back surface of the buffer material 37, there are provided holding units 37a each of which holds cables 20b pushed into the holding unit 37a after being wired on the back surface of the solar cell module 20. As shown in FIG. 16, the holding units 37a are for holding the cables 20b that extend from the terminal boxes 20a and extended on the back surface of the solar cell module 20.

In the solar cell module device of the present embodiment, the cables 20b extended on the back surface of the solar cell module 20 are held by the holding units 37a of the buffer material 37. Therefore, tapes and bands that were conventionally required to fix the cables 20b become unnecessary, and thus the number of parts can be reduced and cost reduction can be made.

Industrial Applicability

As described above, the solar cell module device according to the present invention is useful for a solar cell module device installed on a construction such as a house and a building. Particularly, the solar cell module device is suitable for a solar cell module device installed in areas having heavy snowfall or areas having severe wind and rain.

The invention claimed is:

1. A solar cell module device comprising:
a plurality of solar battery cells;
a light receiving surface;
a back surface;
a frame arranged on an outer edge portion;
a reinforcing frame arranged across the back surface and fitted to the frame; and
a buffer made of a rigid material and arranged between the back surface and the reinforcing frame, wherein
a length of the buffer in a longitudinal direction of the reinforcing frame is shorter than a length of the reinforcing frame in the longitudinal direction, and
the buffer has a recess in which the reinforcing frame is fit, and
the recess being extended parallel to the longitudinal direction of the reinforcing frame.

2. The solar cell module according to claim 1, wherein the buffer has a height not causing the back surface of the solar cell module to come in contact with the reinforcing frame when the solar cell module is bent, the height being one of factors including a rigidity of the solar cell module and the length of the reinforcing frame in the longitudinal direction for choosing a buffer material.

3. The solar cell module device according to claim 1, wherein the length of the buffer material in the longitudinal direction of the reinforcing frame is set to a length not causing the back surface of the solar cell module to come in contact with the reinforcing frame when the solar cell module is bent, a length of portions where the buffer is not provided out of a total length of the reinforcing frame in the longitudinal direction being one of factors including a rigidity of the solar cell module and the height of the buffer for choosing a buffer material.

4. The solar cell module according to claim 1, wherein the buffer is fixed to the back surface of the solar cell module.

5. The solar cell module according to claim 1, wherein the material is engaged with the reinforcing frame to suppress movement of the buffer material to a direction of the back surface of the solar cell module.

6. The solar cell module according to claim 1, wherein a plurality of the buffers are arranged in a length direction of the reinforcing frame.

7. The solar cell module according to claim 1, wherein the buffer has a positioning mark that is a target of positioning by matching the mark with any portion of the solar cell module.

8. The solar cell module according to claim 1, wherein
an electrode line being visible on the back surface of the solar cell module,
a plurality of projections being arranged on an end of the buffer, and
at least one of the projections being fixed to the back surface of the solar cell module so as to be matched with the electrode line.

9. A solar cell module device comprising:
a plurality of solar battery cells;
a light receiving surface;
a back surface;
a frame arranged on an outer edge portion;
a reinforcing frame arranged across the back surface and fitted to the frame; and
a buffer made of a rigid material and arranged between the back surface and the reinforcing frame, wherein
a length of the buffer in a longitudinal direction of the reinforcing frame is shorter than a length of the reinforcing frame in the longitudinal direction, and
the buffer has a holding unit for holding a cable arranged on the back surface of the solar cell module.

10. The solar cell module according to claim 9, wherein the holding unit holds the cable parallel to the longitudinal direction of the reinforcing frame.

11. The solar cell module according to claim 9, wherein the holding unit is arranged on an end of the buffer, the end being parallel to the longitudinal direction of the reinforcing frame.

12. The solar cell module according to claim 9, wherein
a height of a peripheral portion of the buffer is shorter than a height of a central portion of the buffer, and
the holding unit is arranged on the peripheral portion.

13. A solar cell module device comprising:
a plurality of solar battery cells;
a light receiving surface;
a back surface;
a frame arranged on an outer edge portion;
a reinforcing frame arranged across the back surface and fitted to the frame; and a buffer made of a rigid material and arranged between the back surface and the reinforcing frame, wherein a length of the buffer in a longitudinal direction of the reinforcing frame is shorter than a length of the reinforcing frame in the longitudinal direction, and the solar battery cells being visible on the back surface of the solar cell module, an external-outline shape of the buffer is the same as an external-outline shape of each of the solar battery cells, and the buffer being fixed to be superimposed with one of the solar battery cells on the back surface of the solar cell module.

14. A solar cell module device comprising:

a plurality of solar battery cells;

a light receiving surface;

a back surface;

a frame arranged on an outer edge portion;

a reinforcing frame arranged across the back surface and fitted to the frame; and a buffer made of a rigid material and arranged between the back surface and the reinforcing frame, wherein a length of the buffer in a longitudinal direction of the reinforcing frame is shorter than a length of the reinforcing frame in the longitudinal direction, and an electrode line being visible on the back surface of the solar cell module, and the buffer being fixed to the back surface of the solar cell module such that at least one side of the buffer is matched with the electrode line.

* * * * *